US010091719B2

(12) United States Patent
Nylander et al.

(10) Patent No.: US 10,091,719 B2
(45) Date of Patent: Oct. 2, 2018

(54) METHODS AND APPARATUS FOR ENABLING TRAFFIC STEERING BETWEEN HETEROGENEOUS TELECOMMUNICATION NETWORKS

(71) Applicant: Telefonaktiebolaget L M Ericsson (publ), Stockholm (SE)

(72) Inventors: Tomas Nylander, Värmdö (SE); Per-Daniel Stålnacke, Bromma (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 91 days.

(21) Appl. No.: 14/441,364

(22) PCT Filed: Nov. 23, 2012

(86) PCT No.: PCT/EP2012/073502
§ 371 (c)(1),
(2) Date: May 7, 2015

(87) PCT Pub. No.: WO2014/079509
PCT Pub. Date: May 30, 2014

(65) Prior Publication Data
US 2015/0289200 A1 Oct. 8, 2015

(51) Int. Cl.
*H04W 48/18* (2009.01)
*H04W 76/18* (2018.01)
(Continued)

(52) U.S. Cl.
CPC .......... *H04W 48/18* (2013.01); *H04W 48/06* (2013.01); *H04W 76/027* (2013.01);
(Continued)

(58) Field of Classification Search
CPC ... H04W 48/06; H04W 48/18; H04W 76/027; H04W 84/12; H04W 88/06
See application file for complete search history.

(56) References Cited

U.S. PATENT DOCUMENTS

2004/0260805 A1* 12/2004 Aoyama ........... H04W 36/0066
709/224
2008/0020770 A1* 1/2008 Hofmann ............... H04W 36/22
455/438
(Continued)

FOREIGN PATENT DOCUMENTS

EP 1441556 A1 7/2004
WO 0137602 A1 5/2001
(Continued)

OTHER PUBLICATIONS

EP office action in application No. 12791174.1, dated Nov. 16, 2017.

*Primary Examiner* — Rina C Pancholi
(74) *Attorney, Agent, or Firm* — Patent Portfolio Builders, PLLC

(57) ABSTRACT

According to a first aspect there is provided a method of operating a user terminal when attempting to move from a source network that is one of a 3GPP network and a WLAN, to a target network that is the other of a 3GPP network and a WLAN. The method comprises, during an attempt to connect to the target network, sending, to the target network, information relating to the performance of the source network experienced by the user terminal.

30 Claims, 5 Drawing Sheets

(51) Int. Cl.
  *H04W 48/06* (2009.01)
  *H04W 76/02* (2009.01)
  *H04W 84/12* (2009.01)
  *H04W 88/06* (2009.01)

(52) U.S. Cl.
  CPC ............ *H04W 76/18* (2018.02); *H04W 84/12* (2013.01); *H04W 88/06* (2013.01)

(56) References Cited

U.S. PATENT DOCUMENTS

| | | | | |
|---|---|---|---|---|
| 2009/0207812 A1* | 8/2009 | Gupta | ............... | H04W 36/0094 |
| | | | | 370/332 |
| 2010/0189075 A1* | 7/2010 | Iwamura | ........... | H04W 36/0055 |
| | | | | 370/331 |
| 2010/0220665 A1* | 9/2010 | Govindan | ............... | H04L 47/10 |
| | | | | 370/329 |
| 2010/0238903 A1* | 9/2010 | Kitazoe | ............. | H04W 36/0038 |
| | | | | 370/332 |
| 2011/0164593 A1* | 7/2011 | Huet | ................. | H04W 36/0055 |
| | | | | 370/333 |

FOREIGN PATENT DOCUMENTS

| | | |
|---|---|---|
| WO | 2012095163 A1 | 7/2012 |
| WO | 2012151426 A1 | 11/2012 |

\* cited by examiner

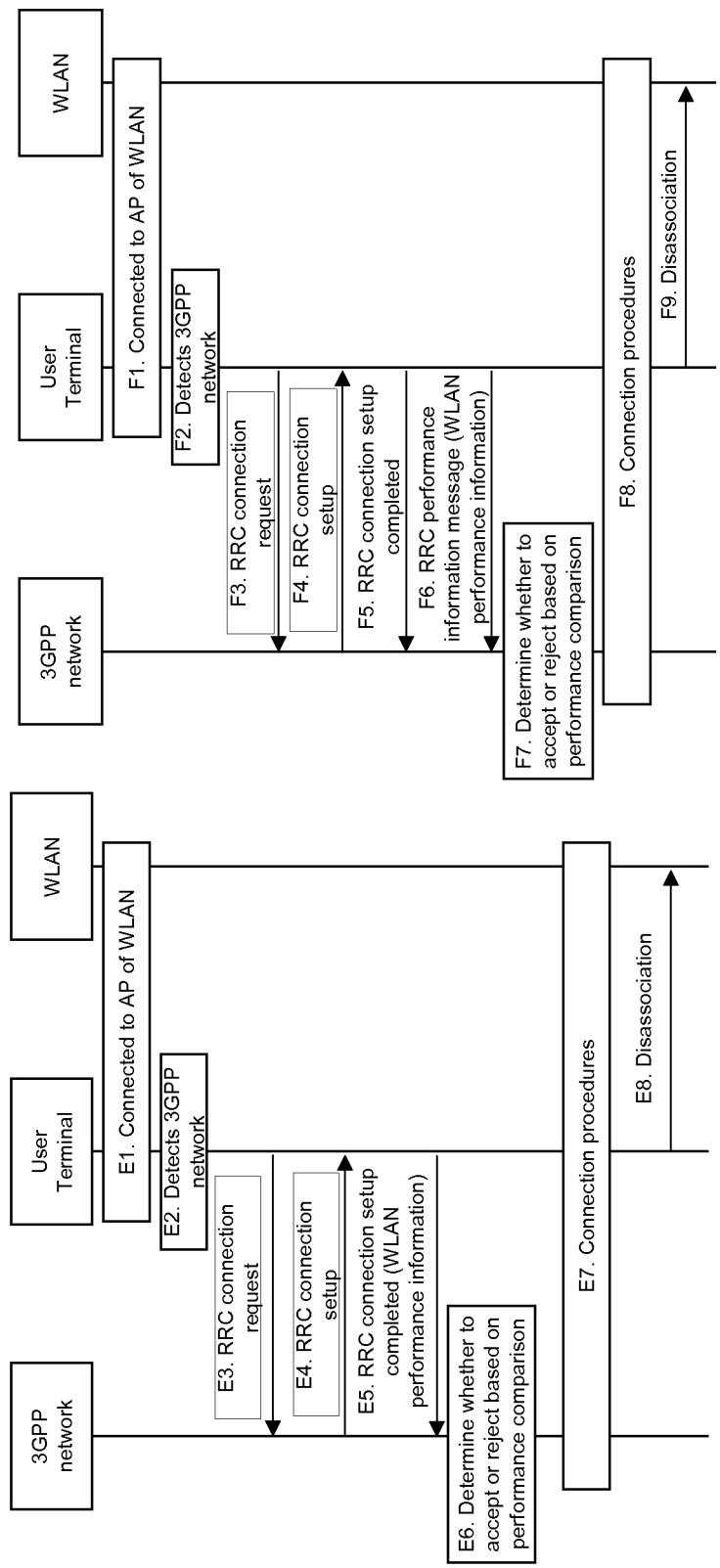

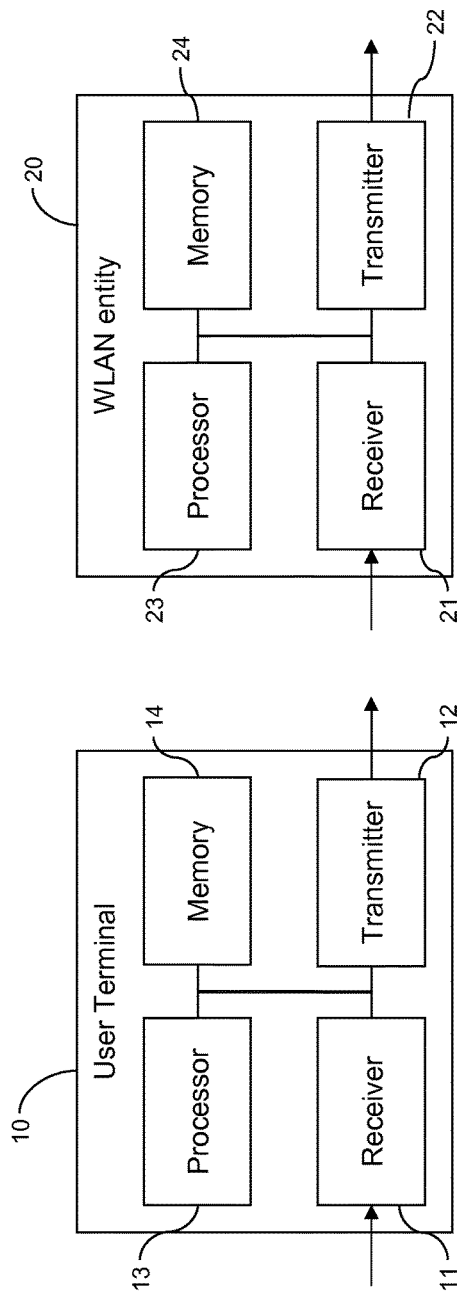
Figure 4
Figure 5
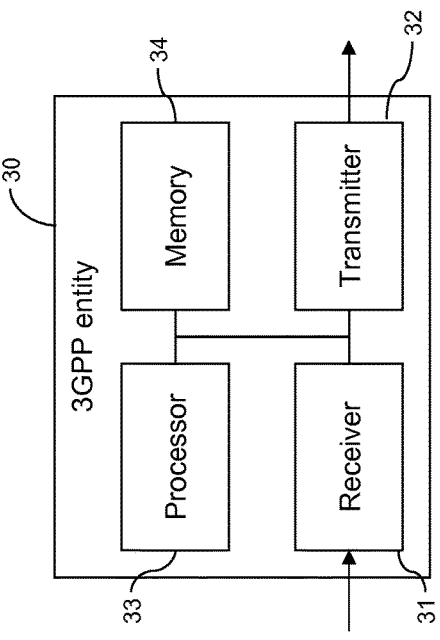
Figure 6

METHODS AND APPARATUS FOR ENABLING TRAFFIC STEERING BETWEEN HETEROGENEOUS TELECOMMUNICATION NETWORKS

TECHNICAL FIELD

The present invention relates to methods and apparatus for enabling traffic steering between heterogeneous telecommunications networks. More particularly, the invention relates to methods and apparatus for transferring network performance information for use in determining whether a user terminal should move from a source network to a target network.

BACKGROUND

Data traffic in mobile telecommunications networks is continually increasing. Consequently, operators are deploying heterogeneous access networks that make use of multiple radio access technologies (RATs) in order to provide greater capacity, particularly in high traffic areas and areas that otherwise have poor network coverage.

Typically, the radio access technologies utilised as part of these heterogeneous access networks include UMTS Radio Access Network (UTRAN) and an Evolved UTRAN (eUTRAN), and Wi-Fi/WLAN RAN. For example, FIG. 1 illustrates schematically a heterogeneous access network comprised of a UTRAN, an eUTRAN, and a Wi-Fi/WLAN RAN. In this regard, both the UTRAN and eUTRAN standards are defined by the 3rd Generation Partnership Project (3GPP), and the relevant 3GPP standards therefore define capabilities for interaction between these 3GPP networks. In contrast, the Wi-Fi/WLAN standards are defined by the Institute of Electrical and Electronics Engineers (IEEE), and neither the IEEE standards nor the 3GPP standards define capabilities for interaction between a Wi-Fi/WLAN network and a 3GPP network. Furthermore, as a WLAN network and a 3GPP network are part of separate domains that use different management systems, different paradigms, different identities etc., there is no mechanism that allows either network to determine information relating to the other network.

Consequently, for a device/user terminal (i.e. user equipment (UE), station (STA) etc) that is both 3GPP and WiFi/WLAN capable, and can therefore move between a 3GPP network and a WLAN, the decision to move between a 3GPP network and a WLAN will be made by the user terminal. For example, for most currently available user terminals, when the user terminal is within the coverage of both a WLAN and a 3GPP network, the user terminal will automatically attempt to connect to the WLAN and will detach from the 3GPP network. As a further example, a user terminal could decide to attempt to associate with a WLAN if the connection to a 3GPP network is poor. In such circumstances, neither the 3GPP network nor the WLAN will have any knowledge of each other, and it will therefore appear to the serving/source network (i.e. the network from which the user terminal is moving) as if the user terminal is merely disconnecting, whilst the user terminal has in fact moved to an alternative network.

It has been recognised here that an issue that arises from the fact that the decision to move/switch between a WLAN and a 3GPP network is made by the user terminal, is that at the very least the decision is made by the user terminal without knowledge of the conditions within or performance of the destination/target network, and possibly without taking into account the performance that the user terminal is receiving from the serving/source network. For example, if a user terminal connected to a 3GPP network were to automatically connect to a WLAN upon detection, and therefore disconnect from the 3GPP network, this could result in an overload in the WLAN and/or underutilisation of the 3GPP network. By way of further example, if a user terminal associated with a WLAN were to determine that the performance received from the WLAN is poor, and therefore proceeded to connect to a 3GPP network and disassociate from the WLAN, it could be the case that the 3GPP network is heavily loaded, such that moving from the WLAN to the 3GPP network has a detrimental effect on the performance received by the user terminal.

SUMMARY

It is therefore an object of the present invention to provide methods and apparatus for enabling traffic steering between heterogeneous telecommunications networks. In particular, these methods and apparatus enable performance information relating to a source network to be transferred to a target network. These methods and apparatus thereby allow the target network to determine whether a user terminal should move from the source network to the target network.

According to a first aspect there is provided a method of operating a user terminal when attempting to move from a source network that is one of a 3GPP network and a WLAN, to a target network that is the other of a 3GPP network and a WLAN. The method comprises, during an attempt to connect to the target network, sending, to the target network, information relating to the performance of the source network experienced by the user terminal.

The method may further comprise, after sending the source network performance information to the target network, establishing that the attempt to connect to the target network has been unsuccessful, and consequently maintaining a connection to the source network.

The method may further comprise receiving a message from the target network, the message indicating that the target network can utilise source network performance information.

The step of sending, to the target network, information relating to the performance of the source network experienced by the user terminal may further comprise one or more of:

when attempting to move from the 3GPP network to the WLAN, sending to the WLAN information relating to the performance of the 3GPP network experienced by the user terminal; and when attempting to move from the WLAN to the 3GPP network, sending to the 3GPP network information relating to the performance of the WLAN experienced by the user terminal.

When attempting to move from a 3GPP network to a WLAN, the performance information relating to the 3GPP network may be sent to the WLAN during an attempt to associate with the WLAN. The method may then further comprise, after sending 3GPP network performance information to the WLAN, receiving a message from the WLAN indicating that the attempt to associate with the WLAN is accepted, and consequently disconnecting from the 3GPP network. Alternatively, or in addition, the method may also further comprise, after sending 3GPP network performance information to the WLAN, establishing that the attempt to associate with the WLAN has been unsuccessful, and consequently maintaining a connection to the 3GPP network.

Performance information relating to the 3GPP network may identify a 3GPP cell to which the user terminal is attached.

When attempting to move from a 3GPP network to a WLAN, the step of sending to the WLAN information relating to the performance received by the user terminal from the 3GPP network may comprise any one of:

- generating an authentication frame that includes performance information relating to the 3GPP network, and sending the authentication frame to the WLAN;
- generating an association request frame that includes performance information relating to the 3GPP network, and sending the association request frame to the WLAN;
- generating an association request frame that includes an indication that a further frame is to be sent, sending the association request frame to the WLAN, then generating a further frame that includes performance information relating to the 3GPP network, and sending the further frame to the WLAN; and
- after sending an association request frame to the WLAN, generating a further frame that includes performance information relating to the 3GPP network, and sending the further frame to the WLAN.

When attempting to move from a WLAN to a 3GPP network, the performance information relating to the WLAN may be sent to the 3GPP network during an attempt to attach to the 3GPP network. The method may then further comprise, after sending WLAN performance information to the 3GPP network, receiving a message from the 3GPP network indicating that the attempt to attach to the 3GPP network is accepted, and consequently terminating an association with the WLAN. Alternatively, or in addition, the method may also further comprise, after sending WLAN performance information to the 3GPP network, establishing that the attempt to attach to the 3GPP network has been unsuccessful, and consequently maintaining an association with the WLAN. Performance information relating to the WLAN may identify a WLAN AP with which the user terminal is associated.

When attempting to move from a WLAN to a 3GPP network, the step of sending to the 3GPP network information relating to the performance received by the user terminal in the WLAN may comprise any one of:

- generating a connection request message that includes performance information relating to the WLAN, and sending the connection request message to the 3GPP network;
- generating a connection setup complete message that includes performance information relating to the WLAN, and sending the connection setup complete message to the 3GPP network;
- generating a connection setup complete message that includes an indication that performance information is to be sent, sending the connection setup complete message to the 3GPP network, then generating a further message that includes performance information relating to the WLAN, and sending the further frame to the 3GPP network; and
- after sending connection setup complete message to the 3GPP network, generating a further message that includes performance information relating to the WLAN, and sending the further frame to the 3GPP network.

According to a second aspect, there is provided a method of operating an entity of a WLAN. The method comprises, during an attempt by a user terminal to associate with the WLAN, receiving, from the user terminal, performance information relating to the performance of a 3GPP network to which the user terminal is currently attached, and using the received 3GPP network performance information to determine if the attempt to associate with the WLAN should be accepted.

The method may further comprise causing transmission of a message indicating that the WLAN can utilise 3GPP network performance information.

The step of using the received 3GPP network performance information to determine if the attempt to associate with the WLAN should be accepted may comprise comparing the received 3GPP network performance information to the expected performance of the WLAN. If the comparison indicates that the expected performance of the WLAN is better than the performance received by the user terminal from the 3GPP network, accepting the attempt to associate with the WLAN. If the comparison indicates that the expected performance of the WLAN is worse than the performance received by the user terminal from the 3GPP network, rejecting the attempt to associate with the WLAN.

According to a third aspect, there is provided a method of operating an entity of a 3GPP network. The method comprises, during an attempt by a user terminal to attach to the 3GPP network, receiving, from the user terminal, performance information relating to the performance of a WLAN with which the user terminal is currently associated, and using the received WLAN performance information to determine if the attempt to connect to the 3GPP network should be accepted.

The method may further comprise causing transmission of a message indicating that the 3GPP network can utilise WLAN performance information.

The step of using the received WLAN performance information to determine if the attempt to connect to the 3GPP network should be accepted may comprise comparing the received WLAN performance information to the expected performance of the 3GPP network. If the comparison indicates that the expected performance of the 3GPP network is better than the performance received by the user terminal from the WLAN, accepting the attempt to connect to the 3GPP network. If the comparison indicates that the expected performance of the 3GPP network is worse than the performance received by the user terminal from the WLAN, rejecting the attempt to connect to the 3GPP network.

According to a fourth aspect there is provided a user terminal capable of moving from a source network that is one of a 3GPP network and a WLAN to a target network that is the other of a 3GPP network and a WLAN. The user terminal comprises a processor configured to generate information relating to the performance of the source network experienced by the user terminal and to cause the source network performance information to be sent to the target network during an attempt to connect to the target network. The user terminal further comprises a transmitter configured to send the source network performance information to the target network.

The processor may be further configured to establish that the attempt to connect to the target network has been unsuccessful, and to consequently maintain a connection to the source network.

The user terminal may further comprise a receiver configured to receive a message from the target network, the message indicating if the target network can utilise source network performance information. The processor may then be further configured to determine that the target network has indicated that it can utilise source network performance information, and to consequently cause the source network performance information to be sent the target network.

The processor may be configured to cause the source network performance information to be sent the target network by implementing one or more of:

when attempting to move from the 3GPP network to the WLAN, causing information relating to the performance of the 3GPP network experienced by the user terminal to be sent to the WLAN; and when attempting to move from the WLAN to the 3GPP network, causing information relating to the performance of the WLAN experienced by the user terminal to be sent to the 3GPP network.

When the user terminal is attempting to move from the 3GPP network to the WLAN, the processor may be configured to cause performance information relating to the 3GPP network to be sent to the WLAN during an attempt to associate with the WLAN. The user terminal may then further comprise a receiver configured to receive a message from the WLAN indicating that the attempt to associate with the WLAN is accepted. The processor may then be further configured to cause the user terminal to disconnect from the 3GPP network upon receipt of the message. Alternatively, or in addition, the processor may be further configured to establish that the attempt to associate with the WLAN has been unsuccessful, and to consequently cause the user terminal to maintain a connection to the 3GPP network.

The processor may be configured to generate performance information relating to the 3GPP network that identifies a 3GPP cell to which the user terminal is attached.

When the user terminal is attempting to move from a WLAN to a 3GPP network, the processor may be configured to cause performance information relating to the WLAN to be sent to the 3GPP network during an attempt to attach to the 3GPP network. The user terminal may then further comprise a receiver configured to receive a message from the 3GPP network indicating that the attempt to attach to the 3GPP network is accepted. The processor may then be further configured to cause the user terminal to terminate an association with the WLAN upon receipt of the message. Alternatively, or in addition, the processor may be further configured to establish that the attempt to attach to the 3GPP network has been unsuccessful, and to consequently cause the user terminal to maintain an association with the WLAN.

The processor may be configured to generate performance information relating to the WLAN that identifies a WLAN AP with which the user terminal is associated.

According to a fifth aspect there is provided an entity of a WLAN. The WLAN entity comprises a receiver configured to receive from a user terminal, during an attempt by the user terminal to associate with the WLAN, performance information relating to the performance of a 3GPP network to which the user terminal is currently attached. The WLAN entity further comprises a processor configured to use the received 3GPP network performance information to determine if the attempt to associate with the WLAN should be accepted.

The processor may be configured to cause transmission of a message indicating that the WLAN can utilise 3GPP network performance information.

The processor may be configured to determine if the attempt to associate with the WLAN should be accepted by comparing the received 3GPP network performance information to the expected performance of the WLAN. The processor may be configured to accept the attempt to associate with the WLAN if the comparison indicates that the expected performance of the WLAN is better than the performance of the 3GPP network experienced by the user terminal. The processor may be configured to reject the attempt to associate with the WLAN if the comparison indicates that the expected performance of the WLAN is worse than the performance of the 3GPP network experienced by the user terminal.

According to a sixth aspect there is provided an entity of a 3GPP network. The 3GPP network entity comprises a receiver configured to receive from a user terminal, during an attempt by the user terminal to attach to the 3GPP network, performance information relating to the performance of a WLAN with which the user terminal is currently associated. The 3GPP network entity further comprises a processor configured to use the received WLAN performance information to determine if the attempt to connect to the 3GPP network should be accepted.

The processor may be configured to cause transmission of a message indicating that the 3GPP network can utilise WLAN performance information.

The processor may be configured to determine if the attempt to attach to the 3GPP network should be accepted by comparing the received WLAN performance information to the expected performance of the 3GPP network. The processor may be configured to accept the attempt to attach to the 3GPP network if the comparison indicates that the expected performance of the 3GPP network is better than the performance of the WLAN experienced by the user terminal. The processor may be configured to reject the attempt to attach to the 3GPP network if the comparison indicates that the expected performance of the 3GPP network is worse than the performance of the WLAN experienced by the user terminal.

BRIEF DESCRIPTION OF THE DRAWINGS

Some embodiments of the present invention will now be described in detail with reference to the accompanying drawings, in which:

FIGS. 3a, 3b and 3c are signalling flow diagrams illustrating examples of a user terminal attempting to move from a WLAN to a 3GPP network in accordance with the methods described herein;

FIG. 4 illustrates schematically an embodiment of a user terminal configured to implement the methods described herein;

FIG. 5 illustrates schematically an embodiment of an entity of a WLAN configured to implement the methods described herein;

FIG. 6 illustrates schematically an embodiment of an entity of a 3GPP network configured to implement the methods described herein.

DETAILED DESCRIPTION

Figure 1:
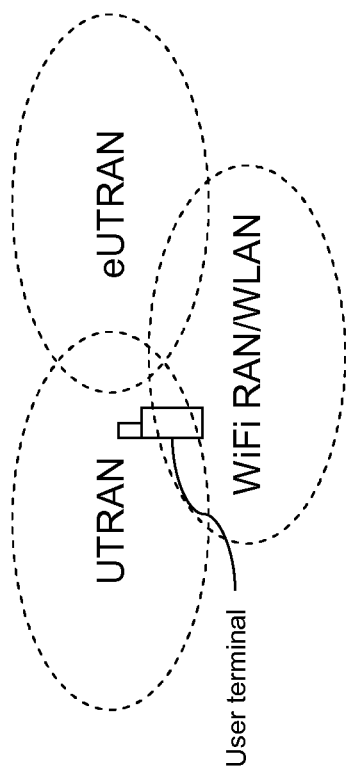
FIG. 1 illustrates schematically an example of a heterogeneous network.

In order to at least mitigate the problems identified above there will now be described methods and apparatus for enabling traffic steering between heterogeneous telecommunications networks. In particular, these methods and apparatus enable performance information relating a source/origin network to be transferred to a target/destination network. These methods involve configuring a user terminal such that, when the user terminal attempts to move from a source network that is one of a 3GPP network and a WLAN to a target network that is the other of a 3GPP network and a WLAN, the user terminal sends information relating to the performance of the source network experienced by the user terminal to the target network. For example, the performance information can include one or more performance indicators relating to the connection between the user terminal and the source network. In this regard, a performance indicator could represent a performance-related characteristic/attribute of the connection between the user terminal and source network as experienced by/measured by the user terminal.

These methods and apparatus thereby allow the target network to use the performance information relating to performance of the source network to determine whether to accept or reject the attempt to connect, and thereby determining whether the user terminal should move from the source network to the target network. In doing so, these methods and apparatus provide that the user terminal can be steered towards the network that is most likely to provide the best performance to the user terminal. Furthermore, by providing that the performance information can be transferred between networks, these methods and apparatus provide that the transferred performance information can be stored and used by network operators to guide network modifications and/or extensions in order to ensure a consistent end user experience, and can also assist customer care when responding to complaints relating to performance.

Therefore, when attempting to move from a 3GPP cell to a WLAN AP, the user terminal will be configured to send, to the WLAN, information relating to the performance received by/provided to the user terminal from the 3GPP network. For example, the user terminal could be configured to send the performance information relating to the 3GPP network during an attempt to associate with the WLAN AP. The user terminal could also be configured such that the performance information relating to the 3GPP network identifies the 3GPP cell to which the user terminal is attached. For example, the performance information could include a 3GPP Cell Global Identity of the 3GPP cell to which the user terminal is attached, or any other suitable identifier. In addition, or as an alternative, when attempting to move from a WLAN AP to a 3GPP cell, the user terminal will be configured to send, to the 3GPP network, information relating to the performance received by/provided to the user terminal from the WLAN. For example, the user terminal could be configured to send the performance information relating to the WLAN during an attempt to connect to the 3GPP cell. The user terminal could also be configured such that the performance information relating to the WLAN identifies the WLAN AP with which the user terminal is associated. For example, the performance information could include a Media Access Control (MAC) address or basic service set identifier (BSSID) of the WLAN AP, or any other suitable identifier.

By way of example only, the performance information relating to the source/serving network could include, but is not limited to, the throughput and delay on data sent and/or received by the user terminal using the source/serving network, and the quality of the service perceived by the user terminal.

By way of example only, in order to send to the WLAN information relating to the performance received by the user terminal from the 3GPP network, the user terminal could be configured to generate an association request frame that includes performance information relating to the 3GPP network, and to send the association request frame to the WLAN. As an alternative, the user terminal could be configured to generate an association request frame that includes an indication that a further frame is to be sent, to send the association request frame to the WLAN, to then generate a further frame that includes performance information relating to the 3GPP network, and to send the further frame to the WLAN. As a yet further alternative, the user terminal could be configured to generate an association request frame that includes an indication that performance information is available, and to send the association request frame to the WLAN. Then, if the user terminal receives a message from the WLAN requesting that the user terminal send the performance information, the user terminal can be configured to generate a further frame that includes performance information relating to the 3GPP network, and to send the further frame to the WLAN. As a further alternative, the user terminal could be configured, after sending an association request frame to the WLAN, to generate a further frame that includes performance information relating to the 3GPP network, and to send the further frame to the WLAN. As a yet further alternative, the user terminal could be configured to generate an authentication frame that includes performance information relating to the 3GPP network, and to send the authentication frame to the WLAN.

In addition, in order to send to the 3GPP network information relating to the performance received by/provided to the user terminal in the WLAN, the user terminal can be configured to generate a connection request message that includes performance information relating to the WLAN, and to send the connection request message to the 3GPP network. Alternatively, the user terminal could be configured to generate a connection setup complete message that includes performance information relating to the WLAN, and to send the connection setup complete message to the 3GPP network. As a further alternative, the user terminal could be configured to generate a connection setup complete message that includes an indication that performance information is to be sent, to send the connection setup complete message to the 3GPP network, to then generate a further message that includes performance information relating to the WLAN, and to send the further frame to the 3GPP network. As a yet further alternative, the user terminal could be configured to generate a connection setup complete message that includes an indication that performance information is available, and to send the connection setup complete message to the 3GPP network. Then, if the user terminal receives a message from the 3GPP network requesting that the user terminal send the performance information, the user terminal can be configured to generate a further message that includes performance information relating to the WLAN, and to send the further frame to the 3GPP network. As a further alternative, the user terminal could be configured, after sending connection setup complete message to the 3GPP network, to generate a further message that includes performance information relating to the WLAN, and to send the further frame to the 3GPP network.

These methods can also involve configuring an entity of a WLAN such that, during an attempt by a user terminal to associate with the WLAN, the WLAN entity can receive from the user terminal performance information relating to the performance received by/provided to/measured by the user terminal from a 3GPP network to which the user terminal is currently attached and, can then use the received 3GPP network performance information to determine if the attempt to associate with the WLAN should be accepted. For example, in order to determine if the attempt to associate with the WLAN should be accepted, the WLAN entity can be configured to compare the received 3GPP network performance information to the expected performance of the WLAN. If the comparison indicates that the expected performance of the WLAN is better than (e.g. exceeds, surpasses or is superior to etc) the performance received by the user terminal from the 3GPP network, then the WLAN entity can accept the attempt to associate with the WLAN. If the comparison indicates that the expected performance of the WLAN is worse (e.g. poorer than, inferior to etc) than the performance received by the user terminal from the 3GPP network, then the WLAN entity can reject the attempt to associate with the WLAN.

If the WLAN entity determines that, based on the received 3GPP network performance information, the attempt to associate with the WLAN should be accepted, then the WLAN entity would allow the attempted association to proceed. For example, the WLAN entity could then allow a response message/frame to be sent to the user terminal in response to the attempted association. In this case, after sending performance information relating to the 3GPP network to the WLAN, the user terminal would receive a message from the WLAN indicating that the attempt to associate with the WLAN is accepted, and would consequently disconnect from the 3GPP cell.

Alternatively, if the WLAN entity determines that, based on the received 3GPP network performance information, the attempt to associate with the WLAN should not be accepted, then the WLAN entity would prevent the attempted association from proceeding. In this case, after sending performance information relating to the 3GPP network to the WLAN, the user terminal would establish that the attempt to associate with the WLAN has been unsuccessful.

By way of example only, the WLAN network entity could be an AP of the WLAN, or an Access Controller (AC) of the WLAN network etc.

In addition, these methods can also involve configuring an entity of a 3GPP network, such that, during an attempt by a user terminal to connect to the 3GPP network, the 3GPP entity can receive from the user terminal performance information relating to the performance received by/provided to the user terminal in a WLAN with which the user terminal is currently associated, and can then use the received WLAN performance information to determine if the attempt to connect to the 3GPP network should be accepted. For example, in order to determine if the attempt to connect to the 3GPP network should be accepted, the 3GPP entity can be configured to compare the received WLAN performance information to the expected performance of the 3GPP network. If the comparison indicates that the expected performance of the 3GPP network is better than the performance received by the user terminal from the WLAN, then the 3GPP entity can accept the attempt to connect to the 3GPP network. If the comparison indicates that the expected performance of the 3GPP network is worse than the performance received by the user terminal from the WLAN, then the 3GPP entity can reject the attempt to connect to the 3GPP network.

If the 3GPP entity determines that, based on the received WLAN performance information, the attempt to connect to the 3GPP network should be accepted, then the 3GPP entity would allow the attempted connection to proceed. For example, the 3GPP entity could then allow a message to be sent to the user terminal in response to the attempted connection. In this case, after sending performance information relating to the WLAN to the 3GPP network, the user terminal would receive a message from the 3GPP network indicating that the attempt to connect to the 3GPP network is accepted, and would consequently terminating an association with the WLAN.

Alternatively, if the 3GPP entity determines that, based on the received WLAN performance information, the attempt to connect to the 3GPP network should be not be accepted, then the 3GPP entity would prevent the attempted connection from proceeding. In this case, after sending performance information relating to the 3GPP network to the WLAN, the user terminal would establish that the attempt to connect to the 3GPP network has been unsuccessful.

By way of example only, the 3GPP network entity could be a node within the RAN of the 3GPP network or could be a node within the core network (CN) of the 3GPP network. Expanding upon these examples, the 3GPP network entity could be any of a base station, a Node B, an eNode B, and a radio network controller (RNC) within the RAN of the 3GPP network, or could be any of a Serving GPRS Support Node (SGSN) and a Mobility Management Entity (MME) within the CN of the 3GPP network.

In order to avoid any unnecessary signalling and to provide for backwards compatibility, one or both of the 3GPP network and the WLAN could be configured to send an indication of their support for this performance based determination to a user terminal that may attempt to connect. For example, a system information message broadcast by the 3GPP network and/or the WLAN could be extended to include an indication that the network can utilise source network performance information (i.e. when determining whether to accept or reject an attempt by a user terminal to move to the network from a source network). Based on this broadcast indication, a user terminal could then determine whether or not a target network supports this procedure, and would only provide this source network performance information to the target network if the target network does support this procedure.

Figures 2A, 2B:
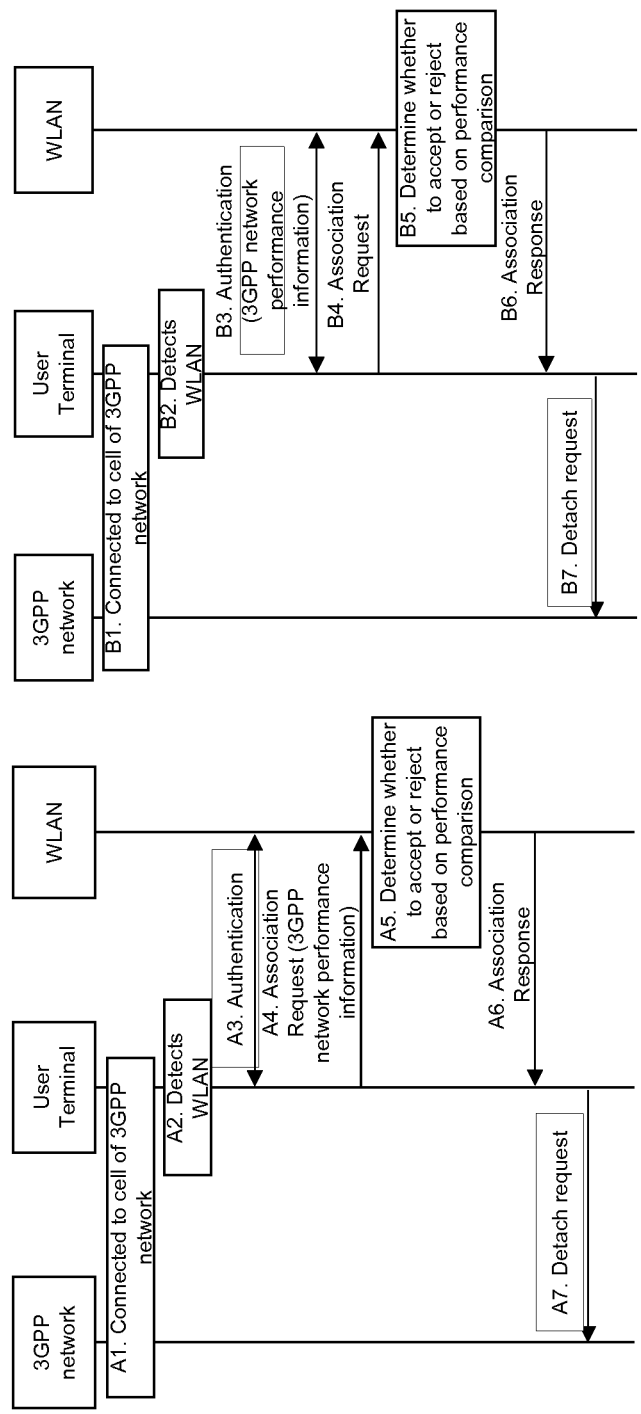
FIGS. 2a, 2b and 2c are signalling flow diagrams illustrating examples of a user terminal attempting to move from a 3GPP network to a WLAN in accordance with the methods described herein.

FIG. 2a is a signalling flow diagram illustrating an example of a user terminal attempting to move from a 3GPP network to a WLAN in accordance with the methods described herein. The steps performed are as follows:

A1. The user terminal is initially attached/connected to a cell of the 3GPP network.

A2. The user terminal subsequently detects an AP of a WLAN and decides to move from the 3GPP network to the WLAN.

A3. The user terminal may then be required to perform an authentication with the WLAN.

A4. If authenticated, the user terminal then sends an association request frame to the WLAN. In this example, the user terminal includes network performance information relating to the 3GPP network in the association request frame sent to the WLAN. The network performance information provides an indication of the performance of the 3GPP network as measured by the user terminal.

A5. The WLAN receives the 3GPP network performance information from the user terminal, and uses this performance information to determine if the attempt to associate with the WLAN should be accepted or rejected. For example, a WLAN entity can perform a comparison of the received 3GPP network performance information and the expected performance of the WLAN. This comparison could be implemented using a pre-defined algorithm that estimates whether the user terminal will get better, worse, or similar performance than that provided by the 3GPP network if the user terminal is allowed to connect to the WLAN.

A6. Based on the determination in step A5, the WLAN will either allow the attempted association to proceed, or will prevent the attempted association from proceeding. In this example, the WLAN determines that the attempt to associate with the WLAN should be accepted, and therefore sends an association response to the user terminal indicating that the attempted association has been successful.

A7. Upon receiving the association response, the user terminal disconnects/detaches from the 3GPP cell be generating and sending a detach request.

FIG. 2b is a signalling flow diagram illustrating a further example of a user terminal attempting to move from a 3GPP network to a WLAN in accordance with the methods described herein. Steps B1 to B7 of this example are essentially the same as steps A1 to A7 of FIG. 2a; however, the user terminal includes the 3GPP network performance information in an authentication frame sent to the WLAN during the authentication procedure of step B3. The WLAN then stores this performance information until it receives the association request from the user terminal (see step B4), at which time the WLAN uses the performance information to determine if the attempt to associate with the WLAN should be accepted or rejected (see step B5).

Figure 2C:
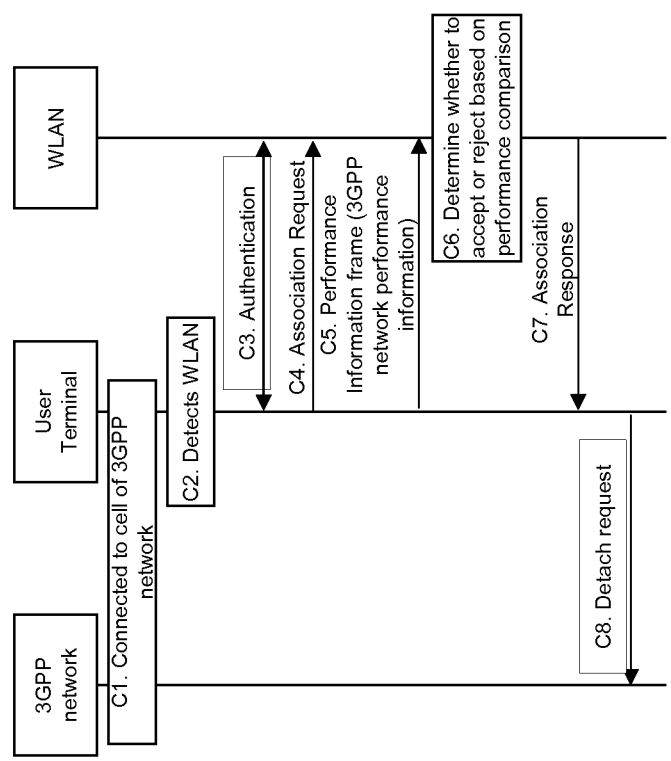

FIG. 2c is a signalling flow diagram illustrating a yet further example of a user terminal attempting to move from a 3GPP network to a WLAN in accordance with the methods described herein. Steps C1 to C8 of this example are essentially the same as steps A1 to A7 of FIG. 2a and steps B1 to B7 of FIG. 2c; however, in additional step C5, the user terminal sends the 3GPP network performance information to the WLAN in a separate performance information frame that is specifically intended to carry this performance information. In this example, this performance information frame is sent after the association request. The user terminal could therefore be configured to generate and send an association request frame that includes an indication that a further frame is to be sent, in order to notify the WLAN that it should expect this further frame. Alternatively, the WLAN protocol could be revised so as to provide for such a new frame/ message, such that the protocol version would indicate that a further frame is to be sent after the association request. In this case, after sending an association request frame to the WLAN, the user terminal could generate and send a performance information frame to the WLAN.

Figure 3A:
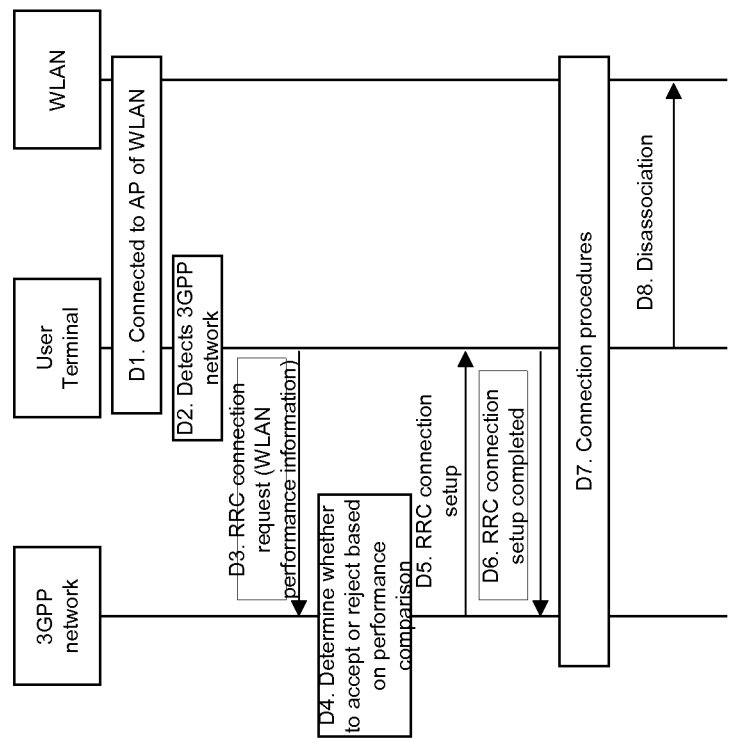

FIG. 3a is a signalling flow diagram illustrating an example of a user terminal attempting to move from a WLAN to a 3GPP network in accordance with the methods described herein. The steps performed are as follows:

D1. The user terminal is initially associated with an AP of a WLAN.

D2. The user terminal detects a cell of the 3GPP network and decides to move from the WLAN to the 3GPP network.

D3. When attempting to attach to the 3GPP network, the user terminal generates and sends a Radio Resource Control (RRC) connection request message to the 3GPP network. In this example, the user terminal includes network performance information relating to the WLAN in the RRC connection request message sent to the 3GPP network. The network performance information provides an indication of the performance of the WLAN as measured by the user terminal.

D4. The 3GPP network receives the WLAN performance information from the user terminal, and uses this performance information to determine if the attempt to connect to the 3GPP network should be accepted or rejected. For example, a 3GPP network entity can perform a comparison of the received WLAN performance information and the expected performance of the 3GPP network. This comparison could be implemented using a pre-defined algorithm that estimates whether the user terminal will get better, worse, or similar performance than that provided by the WLAN if the user terminal is allowed to connect to the 3GPP network D5. Based on the determination in step D4, the 3GPP network will either allow the attempted connection to proceed, or will prevent the attempted connection from proceeding. In this example, the 3GPP network determines that the attempt to connect to the 3GPP network should be accepted, and therefore sends a RRC connection setup message to the user terminal indicating that the attempted connection can proceed.

D6. Upon receiving the RRC connection setup message, the user terminal proceeds with the connection, and responds to the 3GPP network with a RRC connection setup completed message.

D7. The user terminal continues with the standard connection procedures.

D8. Once the connection to the 3GPP network has been completed, the user terminal then disassociates from the WLAN.

In the example of FIG. 3a, the 3GPP network determines that the attempt to connect to the 3GPP network should be accepted. However, if the 3GPP entity were to determine that the attempt to connect to the 3GPP network should be not be accepted, following receipt of a RRC connection request message including network performance information, then the 3GPP network could optionally send a RRC connection reject message to the user terminal to indicate that the attempt has been unsuccessful. In this case, the RRC connection reject message could then include a 'wait time' parameter indicating how long the user terminal should before a new RRC connection request message can be sent.

FIG. 3b is a signalling flow diagram illustrating a further example of a user terminal attempting to move from a WLAN to a 3GPP network in accordance with the methods described herein. Steps E1 to E8 of this example are essentially the same as steps D1 to D8 of FIG. 3a; however, the user terminal includes the WLAN performance information in a RRC connection setup completed message sent to the WLAN in step E5. The 3GPP network therefore determines if the attempt to connect to the 3GPP network should be accepted or rejected after the WLAN performance information has been received (see step E6), and will allow or prevent the connection from being established based on this determination.

In the example of FIG. 3b, the 3GPP network determines that the attempt to connect to the 3GPP network should be accepted. However, if the 3GPP entity were to determine that the attempt to connect to the 3GPP network should be not be accepted, then the 3GPP network could optionally release the connection by sending a RRC connection release message to the user terminal. In this case, the RRC connection release message could include a release cause parameter with a value which indicates that the user terminal should continue to use the WLAN.

Alternatively, the RRC connection release message could include a release cause parameter that indicates that WiFi should be used.

FIG. 3c is a signalling flow diagram illustrating a yet further example of a user terminal attempting to move from a WLAN to a 3GPP network in accordance with the methods described herein. Steps F1 to F9 of this example are essentially the same as steps D1 to D8 of FIG. 3a and steps E1 to E8 of FIG. 3c; however, in additional step F6, the user terminal sends the WLAN performance information to the 3GPP network in a separate performance information message that is specifically intended to carry this performance information.

In this example, this performance information frame is sent after the RRC connection setup completed message. The user terminal could therefore be configured to generate and send a RRC connection setup completed message (see step F5) that includes an indication that a further message is to be sent, in order to notify the 3GPP network that it should expect this further message. This is particularly useful as the RRC connection setup completed message includes upper layer (i.e. Non-Access Stratum (NAS) layer) information that should be forwarded to the core network, such that this indication could inform the 3GPP network that it should store this upper layer information until the network performance information is received from the user terminal in the subsequent performance information message. Alternatively, the user terminal could be configured to include this upper layer information in the performance information message that is sent after the RRC connection setup completed message, and receipt of this performance information message by the 3GPP network would trigger/initiate the determination procedure within the 3GPP network. Then, if the 3GPP network were to determine that the attempt to connect to the 3GPP network should be accepted, the upper layer information can be forwarded to the core network. Alternatively, if the 3GPP network were to determine that the attempt to connect to the 3GPP network should be rejected, the 3GPP network can discard the upper layer information, and could release the connection. For example, the 3GPP network could optionally release the connection by sending a RRC connection release message to the user terminal. In this case, the RRC connection release message could include a release cause parameter with a value which indicates that the user terminal should continue to use the WLAN. Alternatively, the RRC connection release message could include a release cause parameter that indicates that WiFi should be used.

FIG. 4 illustrates schematically an embodiment of a user terminal 10 configured to implement the methods described above. The user terminal 10 can be implemented as a combination of computer hardware and software and comprises a receiver 11, a transmitter 12, a processor 13, and a memory 14. The memory 14 stores the various programs/executable files that are implemented by the processor 13, and also provides a storage unit for any required data. For example, the memory can store any performance information relating to the performance of a network to which the user terminal is currently attached/associated. The programs/executable files stored in the memory 14, and implemented by the processor 13, are configured to implement the methods described above. In this regard, these programs/executable files can include but are not limited to a network detection unit, a network selection unit, a performance information generation unit, and a message generation unit.

FIG. 5 illustrates schematically an embodiment of an entity of a WLAN 20 configured to implement the methods described above. The WLAN entity 20 can be implemented as a combination of computer hardware and software and comprises a receiver 21, a transmitter 22, a processor 23, and a memory 24. The memory 24 stores the various programs/executable files that are implemented by the processor 23, and also provides a storage unit for any required data. For example, the memory 24 can store any 3GPP network performance information received from a user terminal, and any performance comparison algorithms. The programs/executable files stored in the memory 24, and implemented by the processor 23, are configured to implement the methods described above. In this regard, these programs/executable files can include but are not limited to an authentication unit, an association unit, a performance comparison unit, and a message generation unit.

FIG. 6 illustrates schematically an embodiment of an entity of a 3GPP network 30 configured to implement the methods described above. The 3GPP network entity 30 can be implemented as a combination of computer hardware and software and comprises a receiver 31, a transmitter 32, a processor 33, and a memory 34. The memory 34 stores the various programs/executable files that are implemented by the processor 33, and also provides a storage unit for any required data. For example, the memory 34 can store any WLAN performance information received from a user terminal, and any performance comparison algorithms. The programs/executable files stored in the memory 34, and implemented by the processor 33, are configured to implement the methods described above. In this regard, these programs/executable files can include but are not limited to an attachment unit, a performance comparison unit, and a message generation unit.

Although the invention has been described in terms of preferred embodiments as set forth above, it should be understood that these embodiments are illustrative only. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein. For example, in the illustrated example signalling flow diagrams described above, only those messages and headers that are of particular relevance are shown. Those skilled in the art will be aware those messages and headers that have not been included in this illustration. In addition, whilst the above described embodiments specifically relate to heterogeneous networks comprised of at least a 3GPP network and a WLAN, the principles of the methods described herein are equally applicable to heterogeneous networks that comprise other radio access technologies; such as cdmaOne and CDMA2000.

The invention claimed is:
1. A method of operating a user terminal when the user terminal is attempting to move from a source network, that is a 3rd Generation Partnership Project (3GPP) network or a Wireless Local Area Network (WLAN), to a target network, that is the other of the 3GPP network or the WLAN, the method comprising:
during an attempt by the user terminal to connect to the target network,
receiving a message from the target network, wherein the message comprises an indication indicating whether the target network can utilize information relating to performance of the source network as measured by the user terminal;
determining by the user terminal, based on the indication comprised in the received message, that the target network can support the attempt by the user terminal to connect to the target network; and sending by the user terminal, to the target network, the performance information of the source network, based on the determination,
wherein the performance information comprises one or more performance indicators relating to a connection between the user terminal and the source network, thereby allowing the target network to use the performance information to determine whether to accept or reject the attempt of the user terminal to connect to the target network by comparing the received performance information of the source network with an expected performance of the target network, and to further allow the target network to determine whether the user terminal should move from the source network to the target network based on the comparison.

2. The method as claimed in claim 1, further comprising:
after sending the performance information relating to the source network to the target network, establishing that the attempt to connect to the target network has been unsuccessful, and consequently maintaining the connection with the source network.

3. The method as claimed in claim 1, wherein sending, to the target network, information relating to the performance of the source network as measured by the user terminal, further comprises any of:
when attempting to move from the 3GPP network to the WLAN, sending, to the WLAN, performance information relating to the 3GPP network as measured by the user terminal; and
when attempting to move from the WLAN to the 3GPP network, sending, to the 3GPP network, performance information relating to the WLAN as measured by the user terminal.

4. The method as claimed in claim 3, wherein, when attempting to move from the 3GPP network to the WLAN, the performance information relating to the 3GPP network is sent to the WLAN during an attempt to connect with the WLAN.

5. The method as claimed in claim 4, further comprising:
after sending the performance information relating to the 3GPP network to the WLAN,
receiving a message from the WLAN indicating that the attempt to connect with the WLAN is accepted, and consequently disconnecting from the 3GPP network.

6. The method as claimed in claim 4, further comprising:
after sending the performance information relating to the 3GPP network to the WLAN,
establishing that the attempt to connect with the WLAN has been unsuccessful,
and consequently maintaining a connection with the 3GPP network.

7. The method as claimed in claim 3, wherein the performance information relating to the 3GPP network identifies a 3GPP cell to which the user terminal is connected.

8. The method as claimed in claim 3, wherein, when attempting to move from the WLAN to the 3GPP network, the performance information relating to the WLAN is sent to the 3GPP network during an attempt to connect to the 3GPP network.

9. The method as claimed in claim 8, further comprising:
after sending the performance information relating to the WLAN to the 3GPP network,
receiving a message from the 3GPP network indicating that the attempt to connect to the 3GPP network is accepted, and consequently terminating a connection with the WLAN.

10. The method as claimed in claim 8, further comprising:
after sending the performance information relating to the WLAN to the 3GPP network,
establishing that the attempt to connect to the 3GPP network has been unsuccessful, and consequently maintaining a connection with the WLAN.

11. The method as claimed in claim 3, wherein the performance information relating to the WLAN identifies a WLAN Access Point (AP) with which the user terminal is connected.

12. A method of operating an entity of a Wireless Local Area Network (WLAN), the method comprising:
during an attempt by a user terminal to connect to the WLAN,
transmitting a message to the user terminal, wherein the message comprises an indication indicating whether the WLAN can utilize information relating to performance of a $3^{rd}$ Generation Partnership Project (3GPP) network as measured by the user terminal, and wherein the user terminal determines, based on the indication comprised in the received message, that the WLAN can support the attempt by the user terminal to connect to the WLAN;
in response to the user terminal determining that the WLAN can support the attempt by the user terminal to connect to the WLAN, receiving, from the user terminal, the performance information of the 3GPP network, wherein the received performance information of the 3GPP network comprises one or more 3GPP performance indicators relating to a connection between the user terminal and the 3GPP network;
based on the performance information of the 3GPP network, determining whether to accept or reject the attempt to connect to the WLAN by comparing the received performance information of the 3GPP network with an expected performance of the WLAN; and
based on the comparison, determining whether the user terminal should move from the 3GPP network to the WLAN.

13. The method as claimed in claim 12, wherein using the received performance information relating to the 3GPP network to determine if the attempt to connect with the WLAN should be accepted, comprises:
comparing the performance information relating to the 3GPP network to the expected performance of the WLAN;
if the comparison indicates that the expected performance of the WLAN is better than the performance information of the 3GPP network, accepting the attempt to connect with the WLAN; and
if the comparison indicates that the expected performance of the WLAN is worse than the performance information of the 3GPP network, rejecting the attempt to connect with the WLAN.

14. A method of operating an entity of a $3^{rd}$ Generation Partnership Project (3GPP) network, the method comprising:
during an attempt by a user terminal to connect to the 3GPP network,
transmitting a message to the user terminal, wherein the message comprises an indication indicating whether the 3GPP network can utilize information relating to performance of a Wireless Local Area Network (WLAN) as measured by the user terminal, and wherein the user terminal determines, based on the indication comprised in the received message, that the 3GPP network can support the attempt by the user terminal to connect to the 3GPP network;

in response to the user terminal determining that the 3GPP network can support the attempt by the user terminal to connect to the 3GPP network, receiving, from the user terminal, the performance information of the WLAN, wherein the received performance information of the WLAN comprises one or more WLAN performance indicators relating to a connection between the user terminal and the WLAN;

based on the performance information of the WLAN, determining whether to accept or reject the attempt to connect to the 3GPP network by comparing the received performance information of the WLAN with an expected performance of the 3GPP network; and based on the comparison, determining whether the user terminal should move from the WLAN to the 3GPP network.

15. The method as claimed in claim 14, wherein the step of determining whether to accept or reject the attempt to connect to the 3GPP network, comprises:

comparing the received WLAN performance information to the expected performance of the 3GPP network;

if the comparison indicates that the expected performance of the 3GPP network is better than the performance information of the WLAN, accepting the attempt to connect to the 3GPP network; and if the comparison indicates that the expected performance of the 3GPP network is worse than the performance information of the WLAN, rejecting the attempt to connect to the 3GPP network.

16. A user terminal capable of moving from a source network that is a $3^{rd}$ Generation Partnership Project (3GPP) network or a Wireless Local Area Network (WLAN), to a target network, that is the other of the 3GPP network or the WLAN, the user terminal comprising:

a receiver configured to receive a message from the target network during an attempt by the user terminal to connect to the target network, wherein the message comprises an indication indicating whether the target network can utilize information relating to performance of the source network as measured by the user terminal;

a processor and a memory, said memory containing instructions executable by said processor, whereby the user terminal is configured to generate the information relating to the performance of the source network;

the user terminal further configured to determine, based on the indication comprised in the received message, that the target network can support the attempt by the user terminal to connect to the target network, and to cause the performance information of the source network to be sent to the target network during the attempt by the user terminal to connect to the target network based on said determination; and a transmitter configured to send the performance information of the source network to the target network, based on said determination by the user terminal, wherein the performance information comprising one or more performance indicators relating to a connection between the user terminal and the source network thereby allowing the target network to use the performance information to determine whether to accept or reject the attempt to connect to the target network by comparing the received performance information of the source network with an expected performance of the target network, and to further determine whether the user terminal should move from the source network to the target network based on the comparison.

17. The user terminal as claimed in claim 16, wherein the user terminal is further configured to establish that the attempt to connect to the target network has been unsuccessful, and to consequently maintain a connection with the source network.

18. The user terminal as claimed in claim 16, wherein the user terminal is configured to cause the performance information of the source network to be sent to the target network by implementing any of:

when attempting to move from the 3GPP network to the WLAN, causing performance information of the 3GPP network as measured by the user terminal to be sent to the WLAN; and when attempting to move from the WLAN to the 3GPP network, causing performance information of the WLAN as measured by the user terminal to be sent to the 3GPP network.

19. The user terminal as claimed in claim 18, wherein, when the user terminal is attempting to move from the 3GPP network to the WLAN, the user terminal is configured to cause the performance information relating to the 3GPP network to be sent to the WLAN during an attempt to connect with the WLAN.

20. The user terminal as claimed in claim 19, further comprising the receiver configured to receive a message from the WLAN indicating that the attempt to connect with the WLAN is accepted; and wherein the user terminal is further configured to cause the user terminal to disconnect from the 3GPP network upon receipt of the message.

21. The user terminal as claimed in claim 19, wherein the user terminal is further configured to establish that the attempt to connect with the WLAN has been unsuccessful, and to consequently cause the user terminal to maintain a connection with the 3GPP network.

22. The user terminal as claimed in claim 18, wherein the user terminal is configured to generate the performance information of the 3GPP network that identifies a 3GPP cell to which the user terminal is connected.

23. The user terminal as claimed in claim 18, wherein when the user terminal is attempting to move from the WLAN to the 3GPP network, the user terminal is configured to cause the performance information of the WLAN to be sent to the 3GPP network during an attempt to connect to the 3GPP network.

24. The user terminal as claimed in claim 23, further comprising:

the receiver configured to receive a message from the 3GPP network indicating that the attempt to connect to the 3GPP network is accepted; and wherein the user terminal is further configured to cause the user terminal to terminate a connection with the WLAN upon receipt of the message.

25. The user terminal as claimed in claim 23, wherein the user terminal is further configured to establish that the attempt to connect to the 3GPP network has been unsuccessful, and to consequently cause the user terminal to maintain a connection with the WLAN.

26. The user terminal as claimed in claim 18, wherein the user terminal is configured to generate the performance information relating to the WLAN that identifies a WLAN Access Point (AP) with which the user terminal is connected.

27. An entity of a Wireless Local Area Network (WLAN), the WLAN entity comprising:
- a transmitter configured to transmit a message to a user terminal during an attempt by the user terminal to connect to the WLAN, wherein the message comprises an indication indicating whether the WLAN can utilize information relating to performance of a 3$^{rd}$ Generation Partnership Project (3GPP) network as measured by the user terminal, and wherein the user terminal determines, based on the indication comprised in the received message, that the WLAN can support the attempt by the user terminal to connect to the WLAN;
- in response to the user terminal determining that the WLAN can support the attempt by the user terminal to connect to the WLAN, a receiver configured to receive from the user terminal, during the attempt by the user terminal to connect with the WLAN, the performance information of the 3GPP network, wherein the received performance information of the 3GPP network comprising one or more 3GPP performance indicators relating to a connection between the user terminal and the 3GPP network; and
- a processor and a memory, said memory containing instructions executable by said processor, whereby the entity is operative to use the received performance information of the 3GPP network to determine whether to accept or reject the attempt to connect to the WLAN by comparing the received performance information of the 3GPP network with an expected performance of the WLAN;
- and to further determine whether the user terminal should move from the 3GPP network to the WLAN based on the comparison.

28. The entity as claimed in claim 27, wherein the WLAN entity is configured to:
- determine if the attempt to connect with the WLAN should be accepted by comparing the received performance information of the 3GPP network to the expected performance of the WLAN;
- accept the attempt to connect with the WLAN if the comparison indicates that the expected performance of the WLAN is better than the performance information of the 3GPP network as measured by the user terminal; and
- reject the attempt to connect with the WLAN if the comparison indicates that the expected performance of the WLAN is worse than the performance information of the 3GPP network as measured by the user terminal.

29. An entity of a 3$^{rd}$ Generation Partnership Project (3GPP) network, the 3GPP network entity comprising:
- a transmitter configured to transmit a message to a user terminal during an attempt by the user terminal to connect to the 3GPP network, wherein the message comprises an indication indicating whether the 3GPP network can utilize information relating to performance of a Wireless Local Area Network (WLAN) as measured by the user terminal, and wherein the user terminal determines, based on the indication comprised in the received message, that the 3GPP network can support the attempt by the user terminal to connect to the 3GPP network;
- in response to the user terminal determining that the 3GPP network can support the attempt by the user terminal to connect to the 3GPP network, a receiver configured to receive from the user terminal, during the attempt by the user terminal to connect to the 3GPP network, the performance information of the WLAN, wherein the performance information of the WLAN comprising one or more WLAN performance indicators relating to a connection between the user terminal and the WLAN; and
- a processor and a memory, said memory containing instructions executable by said processor whereby the entity is operative to use the received performance information of the WLAN to determine whether to accept or reject the attempt to connect to the 3GPP network by comparing the received performance information of the WLAN with an expected performance of the 3GPP network; and to further determine whether the user terminal should move from the WLAN to the 3GPP network based on the comparison.

30. The entity as claimed in claim 29, wherein the 3GPP network entity is configured to:
- determine if the attempt to connect to the 3GPP network should be accepted by comparing the WLAN performance information to the expected performance of the 3GPP network;
- accept the attempt to connect to the 3GPP network if the comparison indicates that the expected performance of the 3GPP network is better than the performance information of the WLAN as measured by the user terminal; and
- reject the attempt to connect to the 3GPP network if the comparison indicates that the expected performance of the 3GPP network is worse than the performance information of the WLAN as measured by the user terminal.

* * * * *